United States Patent [19]
Lane, Jr.

[11] Patent Number: 5,685,603
[45] Date of Patent: Nov. 11, 1997

[54] APPARATUS WITH A CHILD SEAT AND AN ENERGY ABSORPTION MECHANISM

[75] Inventor: Wendell C. Lane, Jr., Romeo, Mich.

[73] Assignee: TRW Vehicle Safety Systems Inc., Lyndhurst, Ohio

[21] Appl. No.: 611,067

[22] Filed: Mar. 5, 1996

[51] Int. Cl.$^6$ ................................................. B60N 2/42
[52] U.S. Cl. ........................... 297/216.11; 297/216.18; 297/252
[58] Field of Search .................. 297/216.1, 216.11, 297/216.16, 216.18, 250.1, 252

[56] References Cited

U.S. PATENT DOCUMENTS

| | | | |
|---|---|---|---|
| 2,109,728 | 3/1938 | Kovach | 297/216.18 |
| 2,346,895 | 4/1944 | Bergman | 297/216.18 |
| 2,401,748 | 6/1946 | Dillon . | |
| 2,947,353 | 8/1960 | Wimmersperg . | |
| 3,578,376 | 5/1971 | Okazaki-shi et al. | 297/216.18 X |
| 3,583,530 | 6/1971 | De Venne . | |
| 3,645,548 | 2/1972 | Briner | 297/216.11 |
| 3,957,303 | 5/1976 | Mauron . | |
| 4,215,900 | 8/1980 | Coult | 297/216.11 X |
| 5,152,578 | 10/1992 | Kiguchi . | |
| 5,167,421 | 12/1992 | Yunzhao | 297/216.18 |
| 5,290,089 | 3/1994 | Oleszko et al. | 297/216.1 X |
| 5,466,044 | 11/1995 | Barley et al. | 297/252 |

FOREIGN PATENT DOCUMENTS

| | | | |
|---|---|---|---|
| 2596338 | 10/1987 | France | 297/216.11 |
| 2844628 | 4/1980 | Germany | 297/216.1 |

*Primary Examiner*—Milton Nelson, Jr.
*Attorney, Agent, or Firm*—Tarolli, Sundheim, Covell Tummino & Szabo

[57] ABSTRACT

An apparatus (10) for a vehicle includes a child seat (54) for holding a child. A support device (16, 44) supports the child seat (54) on a seat (12) of the vehicle for movement relative to the seat (12) during a collision in which at least one condition exceeds a predetermined threshold. An energy absorbing device (60) absorbs kinetic energy of the child and the child seat (54) during such relative movement. The support device may include support bars (16) that permit sliding movement of the child seat (54) relative to the support bars (16) and the vehicle seat (12). Several types of energy absorbing devices may be used, including compressible bellows (60), cuttable strips of sacrificial material (108), crushable pieces of sacrificial material (154), deformable projections (188), a payout device (250) with webbing (296), compressible shock absorber assemblies (340), and slidable frictionally engaging portions (392 and 396).

34 Claims, 6 Drawing Sheets

APPARATUS WITH A CHILD SEAT AND AN ENERGY ABSORPTION MECHANISM

BACKGROUND OF THE INVENTION

Child seats are used in vehicles when transporting small children. One type of child seat is placed upon an unoccupied vehicle seat. The child seat is secured on the vehicle seat by seat belt webbing associated with the vehicle seat.

SUMMARY OF THE INVENTION

The present invention is an apparatus for use in a vehicle and includes a child seat. A support means supports the child seat on a seat of the vehicle and permits movement of the child seat and a child sitting in the child seat relative to the support means and the vehicle seat during a vehicle collision in which at least one condition exceeds a predetermined threshold. A means absorbs kinetic energy of the child and child seat during movement of the child seat relative to the support means and the vehicle seat.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENT

Figure 1:
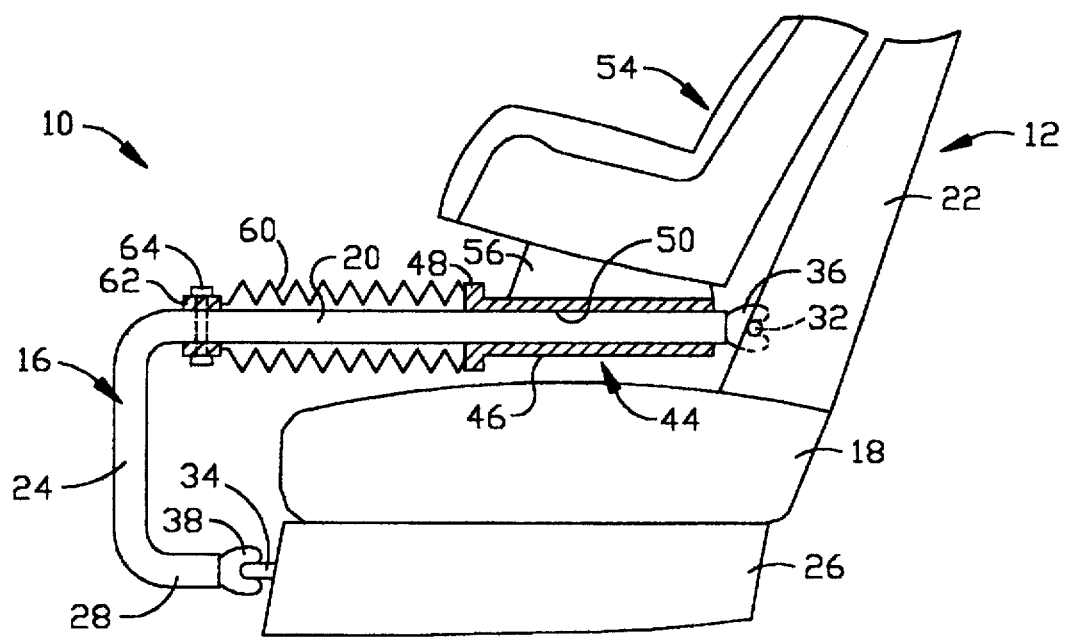
FIG. 1 is a side view, partially in section, of a first embodiment of the present invention with parts in a first position.

The present invention relates to a child seat in a vehicle and may have a variety of constructions. As representative of these constructions, an apparatus 10, which is a first embodiment of the present invention, is shown in FIG. 1. The apparatus 10 includes a child seat 54 which has a suitable child restraint mechanism, such as child seat safety belt webbing (not shown) and/or a locking front shield (not shown). The safety belt webbing is extensible across a child within the child seat, and a tongue associated with the webbing is engaged with a buckle to secure the webbing across the child. The shield is a removable member which extends between the sides of the child seat 54 across the midsection of the child. The shield has a rigid frame, typically made of plastic, with a soft, resilient covering, typically made of foam rubber and cloth.

The apparatus 10 is located on a seat 12 of a vehicle (not shown). The vehicle seat 12 faces forward (left in FIG. 1) in the vehicle. The use of the nomenclature of forward, rearward, front and rear, in this specification, is with reference to the vehicle.

The apparatus 10 includes two support bars 16 (only one shown) for supporting the child seat 54. The support bars 16 are identical and only one of the support bars is described, with the understanding that the other support bar has identical structure and identical function. The support bar 16 is made of metal, or other suitable material, and is generally J-shaped. The support bar 16 is located adjacent to a vehicle seat bottom 18.

An elongate segment 20 of the support bar 16 is elongate in a direction from front to rear and is cylindrical. The elongate segment 20 extends from a location adjacent to a vehicle seat back 22, above the seat bottom 18, to a location above and in front of the seat bottom. The support bar 16 has a first right angle bend at a front end portion of the elongate segment 20. A vertical segment 24 of the support bar 16 extends downward from the first bend to a location at the level of a seat base 26 located beneath the seat bottom 18. The support bar 16 has a second right angle bend at a lower end portion of the vertical segment 24. A lower segment 28 of the support bar 16 extends rearward from the second right angle bend to a location adjacent to the seat base 26.

The vehicle seat 12 has first and second mounting fixtures 32 and 34 (schematically shown). The first mounting fixture 32 is recessed within the seat back 22 and is secured to an internal frame (not shown) of the vehicle seat 12. Attached to a rear end portion of the elongate segment 20 is a first connector 36 (schematically shown). The first connector 36 is locked with the first mounting fixture 32 to fix the support bar 16 relative to the seat back 22. The first mounting fixture 32 of the seat back 22 and the first connector 36 may be any suitable locking device, such as an interengaging pin and receptacle device.

A second connector 38 (schematically shown) is fixed to a rear end portion of the lower segment 28 of the support bar 16. The second connector 38 is locked with the second mounting fixture 34 to fix the support bar 16 relative to the seat base 26. The second mounting fixture 34 and the second connector 38 are similar to the first mounting fixture 32 and the first connector 36, in that they may be any suitable locking device. The first and second mounting fixtures 32, 34 and the first and second connectors 36, 38 hold the support bar 16 relative to the vehicle seat 12.

The second support bar 16 (not shown) is attached to the vehicle seat 12 in the same manner. The two support bars 16 are spaced apart and are parallel to each other. The support bars 16 are detachable from the vehicle seat 12 when the first and second connectors 36, 38 and the first and second mounting fixtures 32, 34 are unlocked, to permit use of the vehicle seat 12 by an adult vehicle occupant.

A base 56 of the child seat 54 connects the seat portion of the child seat to a seat carrier 44. The seat carrier 44 extends between the elongate segments 20 of the two support bars 16. The seat carrier 44 is made of metal or other suitable material. At each of the two sides of the seat carrier 44 is a guide tube 46 (only one shown). The guide tubes 46 are identical. Thus, only one of the guide tubes 46 is shown and discussed, with the understanding that the other guide tube has identical structure and function.

The guide tube 46 is elongate in the front to rear direction. The guide tube 46 has an annular shoulder 48 located at a front end portion of the guide tube. A cylindrical passage 50 extends the length of the guide tube 46 and has a diameter which is slightly larger than the outer diameter of the elongate segment 20 of the support bar 16. The guide tube 46 encircles a portion of the elongate segments 20.

The seat carrier 44 is supported by the support bars 16. The child seat 54 and the child sitting in the child seat are supported on the vehicle seat 12 by the seat carrier 44 and the support bars 16. The seat carrier 44 is slidable along the elongate segments 20. During sliding movement, the elongate segments 20 pass through the passage 50 of the guide tube 46. The child seat 54 and a child sitting in the child seat move with the seat carrier 44 along the support bars 16.

The apparatus 10 includes two bellows 60 (only one shown). One bellows 60 is associated with each support bar 16. The two bellows 60 are identical and only one of the bellows is discussed, with the understanding that the other bellows has identical structure and function. The bellows 60 is tube-like and has a plurality of annular accordion pleats.

The bellows 60 encircles a portion of the elongate segment 20 of the support bar 16 located forward of the guide tube 46. One end portion of the bellows 60 is fixed to the annular shoulder 48 of the guide tube 46. The other end portion of the bellows 60 is fixed to an annular stop collar 62 which encircles a portion of the elongate segment 20 of the support bar 16. The stop collar 62 is located adjacent to the front end portion of the elongate segment 20 and is fixed relative to the support bar 16 with a suitable fastener 64.

The bellows 60 has characteristics which are selected to permit compression of the bellows in response to a predetermined amount of force applied to the bellows to enable sliding movement of the seat carrier 44 along the elongate segment 20. The characteristics of the bellows 60 which are selected to permit compression include characteristics of the material of the bellows 60 (e.g., strength of material), thickness of the material, and size of pleats in the bellows. Preferably, the bellows 60 is made of metal. Prior to sliding movement of the seat carrier 44, the bellows 60 has a non-compressed, expanded length.

When it is desired to transport a child in a vehicle, the apparatus 10 is secured onto the vehicle seat 12. Specifically, the apparatus 10 is placed on the vehicle seat 12, and the first and second connectors 36 and 38 are locked with the first and second mounting fixtures 32 and 34, respectively. A child (not shown) is secured within the child seat 54 by the child restraint mechanism associated with the child seat.

The child seat 54 is located near the seat back 22. The guide tubes 46 encircle portions of the elongate segments 20 located near the rear end portions of the elongate segments. Also, the bellows 60 are in an expanded condition, as shown in FIG. 1. The bellows 60 are sufficiently rigid to resist movement of the seat carrier 44 along the elongate segments 20 during normal vehicle travel.

During a vehicle collision, the inertia of the seat carrier 44, the child seat 54 and the child urges the seat carrier to move forward along the support bars 16. The annular shoulders 48 of the guide tubes 46 press against the bellows 60. If the collision generated force with which the annular shoulders 48 press is below a predetermined amount, the bellows 60 do not compress. The bellows 60 thus prevent movement of the seat carrier 44 along the elongate segments 20 of the support bars 16 when this condition of the collision is below the predetermined threshold.

Figure 2:
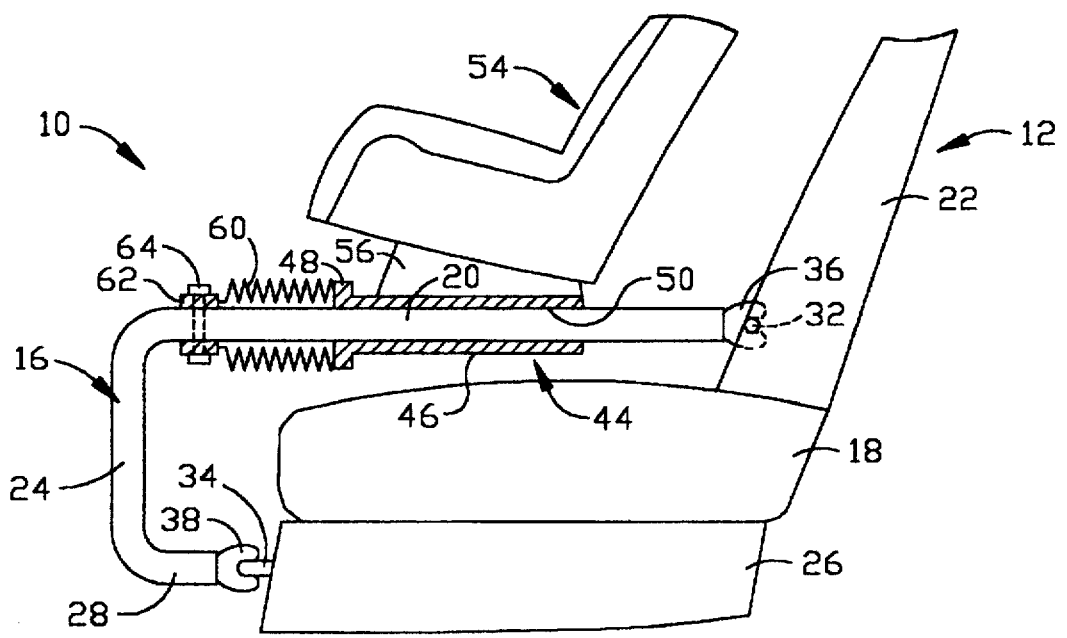
FIG. 2 is a view similar to FIG. 1, with parts in a second position.

If the force with which the annular shoulders 48 press against the bellows 60 is above the predetermined amount, the bellows are compressed, and the seat carrier 44, the child seat 54 and the child (not shown) held within the child seat move forward toward a position shown in FIG. 2. The seat carrier 44 can move along a length of the elongate segments 20, until the bellows 60 are completely compressed against the stop collars 62. The stop collars 62 then stop the forward movement of the seat carrier 44. The bellows 60 thus permits movement of the child seat 54 and the child (not shown) relative to the support bars 60 and the seat carrier 12 when a condition resulting from the collision exceeds a predetermined threshold.

During the vehicle collision, the vehicle is suddenly decelerated to a reduced velocity or a complete stop. Work is performed to decelerate the child. The work results in compression of the bellows 60.

The amount of work which is performed on the child is equal to the reduction in the child's kinetic energy (the work-energy theorem). The reduction in kinetic energy of the child is $\frac{1}{2}M(V_i^2-V_f^2)$, where M is the mass of the child, $V_i$ is the velocity of the child at the beginning of the collision and $V_f$ is the velocity of the child at the end of the collision. The amount of reduction of the child's kinetic energy is referred to as the child's energy and is converted into other forms of energy during the deceleration of the child. The child can physically absorb some of the child's energy without adverse affect.

The compression of the bellows 66 is not instantaneous but instead occurs over a period of time. Thus, deceleration of the child is less abrupt than it would be if the child seat 54 and the child were not permitted to move forward. Further, the bellows 60 absorb energy during compression because deformation of the material of the bellows occurs at each of the pleats of the bellows as the pleats are flattened. Some of the energy absorbed by the bellows 60 is the kinetic energy of the seat carrier 44 and the child seat 54, and some of the energy absorbed by the bellows is the child's energy. A lesser amount of the child's energy is physically absorbed by the child than if the child seat 54 and the child were not permitted to move forward.

Figure 3:
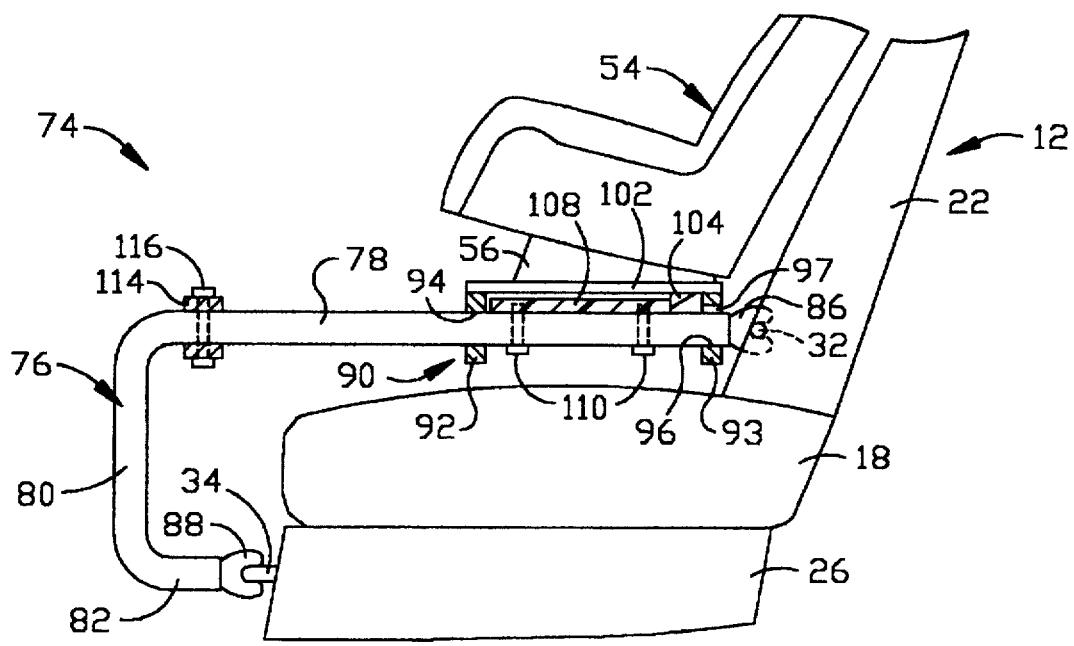
FIG. 3 is a side view, partially in section, of a second embodiment of the present invention.

An apparatus 74 according to a second embodiment of the present invention is shown in FIG. 3. The apparatus 74 is located on a vehicle seat 12 of a vehicle (not shown). The vehicle seat 12 is identical to the vehicle seat described in the discussion of the first embodiment. Accordingly, the same reference numerals are used to identify identical structure.

The apparatus 74 includes two support bars 76 (only one shown). The support bars 76 are identical to each other and only one of the support bars is described, with the understanding that the other support bar has identical structure and identical function. The support bar 76 is made of metal, or other suitable material, and is generally J-shaped. The support bar 76 is located adjacent to the seat bottom 18. An elongate segment 78 of the support bar 76 is elongate in a direction from front to rear and is cylindrical. The elongate segment 78 extends from a location adjacent to the seat back 22, above the seat bottom 18, to a location above and in front of the seat bottom.

A first right angle bend of the support bar 76 is at a front end portion of the elongate segment 78. A vertical segment 80 of the support bar 76 extends downward from the first bend to a location at the level of the seat base 26. The support bar 76 has a second right angle bend at a lower end portion of the vertical segment 80. The support bar 76 has a lower segment 82 which extends rearward from the second bend to a location adjacent to the seat base 26.

Attached to a rear end portion of the elongate segment 78 is a first connector 86 (schematically shown). The first connector 86 is locked with the first mounting fixture 32 to fix the support bar 76 relative to the seat back 22. The first connector 86 is identical to the first connector 36 (FIG. 1) of the first embodiment. Accordingly, the first connector 86 (FIG. 3) and the first mounting fixture 32 may be any suitable locking device, such as an interengaging pin and receptacle device.

A second connector 88 (schematically shown) is fixed to a rear end portion of the lower segment 82 of the support bar 76. The second connector 88 is locked with the second mounting fixture 34 to fix the support bar 76 relative to the seat base 26. The second connector 88 is identical to the second connector 38 of the first embodiment. Accordingly, the second connector 88 and the second mounting fixture 34 may be any suitable locking device.

The second support bar 76 (not shown) is attached to the vehicle seat 12 in the same manner. The two support bars 76 are spaced apart, parallel to each other. The support bars 76 are detachable from the vehicle seat 12 when the first and second connectors 86 and 88 are unlocked, to permit use of the vehicle seat 12 by an adult vehicle occupant (not shown).

A child seat 54 is the same as the child seat of the first embodiment, and the child seat 54 is connected to a seat carrier 90. The seat carrier 90 extends between the elongate segments 78 of the two support bars 76. The seat carrier 90 is made of metal or other suitable material. At each side of the seat carrier 90 is a pair of guide rings 92 and 93 (only one pair shown). Each pair of guide rings 92 and 93 is identical and only one pair of guide rings is discussed in detail, with the understanding that the other pair of guide rings has identical structure and function. The guide ring 92 is located at a front end portion of the seat carrier 90 and the guide ring 93 is located at a rear end portion of the seat carrier.

A cylindrical passage 94 extends through the guide ring 92. A passage 96 extends through the guide ring 93. The passage 96 is cylindrical with a cutout notch 97 extending along an upper side. The notch 97 projects radially out, beyond the cylindrical portion of the passage 96.

The passages 94 and 96 have centers which are aligned along the front to rear direction. The cylindrical diameters of the passages 94, 96 are equal and are also slightly greater than the outer diameter of the elongate segment 78 of the support bar 76. The guide rings 92 and 93 encircle respective portions of the elongate segment 78.

The seat carrier 90 is supported by the support bars 76. The child seat 54 and the child sitting in the child seat are supported on the vehicle seat 12 by the seat carrier 90 and the support bars 76. The seat carrier 90 is slidable along the elongate segments 78. During movement, the elongate segments 78 pass through the guide rings 92 and 93.

The seat carrier 90 includes a top plate 102. Two cutters 104 (only one shown, schematically) are fixed to the top plate 102. Each cutter 104 is located adjacent to a rearward end portion of the top plate 102 and is located above a respective elongate segment 78 of one of the support bars 76. Each cutter 104 is identical and only one of the cutters 104 is described in detail, with the understanding that the other cutter 104 has identical structure and function. The cutter 104 may be of any suitable type. Preferably, the cutter 104 has a cutting edge which faces forward. Also, the cutter 104 is preferably made of relatively hard metal.

The apparatus 74 includes two strips of sacrificial material 108 (only one shown). The strips of sacrificial material 108 are identical and only one of the strips of sacrificial material is described in detail, with the understanding that the other strip of sacrificial material has identical structure and function. The strip of sacrificial material 108 is elongate along the front to rear direction and is located on top of a portion of the elongate segment 78 near the rearward end portion of the elongate segment and between the guide rings 92 and 93 when the seat carrier 90 is adjacent to the seat back 22. Fasteners 110 fix the strip of sacrificial material 108 to the elongate segment 78. The fasteners 110 may be any suitable fasteners, such as metal screws.

The strip of sacrificial material 108 is positioned relative to a respective one of the cutters 104 such that at least a portion of the respective cutter 104 is in alignment along the front to rear direction with a portion of the strip of sacrificial material 108. The cutting edge of the cutter 104 abuts the rear end of the strip of sacrificial material 108. The sacrificial material is less hard than the material of the cutter 104, but is sufficiently hard to resist penetration of the cutter. The sacrificial material is preferably a metal, such as aluminum or brass. However, other suitable materials, such as plastic, may be used for the sacrificial material.

The apparatus 74 includes two annular stop collars 114 (only one shown). Each stop collar 114 is located adjacent to the front end portion of the elongate segment 78 of a respective support bar 76. The stop collars 114 are fixed on the support bar 76 with suitable fasteners 116.

When a child (not shown) is to be transported in a vehicle, the apparatus 74 is secured onto the vehicle seat 12 in a manner identical to the securing of the first embodiment. The child is secured within the child seat 54 in a manner identical to that for the first embodiment.

The child seat 54 is located near the seat back 22. The cutters 104 abut the rear ends of the strips of sacrificial material 108. The strips of sacrificial material 108 prevent movement of the seat carrier 90 relative to the support bars 76 during normal vehicle travel because the sacrificial material resists penetration of the cutters 104.

Upon the occurrence of a vehicle collision, the vehicle is suddenly decelerated. The seat carrier 90 is urged forward along the support bars 76 because of the inertia of the seat carrier, the child seat 54 and the child sitting in the child seat. The cutters 104 bear upon the strips of sacrificial material 108. If the force with which the cutters 104 bear upon the strips of sacrificial material 108 is below a predetermined amount, the strips of sacrificial material do not yield and the cutters do not penetrate and cut the strips of sacrificial material. Accordingly, the strips of sacrificial material 108 prevent forward movement of the seat carrier 90 along the elongate segments 78 of the support bars 76.

If the force with which the cutters 104 bear upon the strips of sacrificial material 108 is above the predetermined amount, the cutters 104 penetrate into and cut the strips of sacrificial material 108. The cutting which occurs may include removal of portions of the strips of material 108 or may include deformation of the strips of sacrificial material to create a groove to permit passage of the respective cutter 104. The seat carrier 90, the child seat 54 and the child in the child seat move forward relative to the vehicle seat 12. The seat carrier 90 can move along the elongate segments 78 until the front guide rings 92 abut against the stop collars 114. The stop collars 114 stop the forward stroke of the seat carrier 90. During the movement of the seat carrier 90 along the elongate segments 78, the portions of the strips of sacrificial material 108 which are not cut away pass through the notches 97 in the guide rings 93.

The cutting of the strips of sacrificial material 108 is not instantaneous but instead occurs over a period of time and results in a reapportionment of the work to decelerate the child over this time period. Deceleration of the child is less abrupt than it would be if the child seat 54 and the child were not permitted to move forward. Further, the strips of sacrificial material 108 absorb energy during the cutting and a lesser amount of the child's energy is physically absorbed by the child than if the above-discussed movement did not occur.

Figure 4:
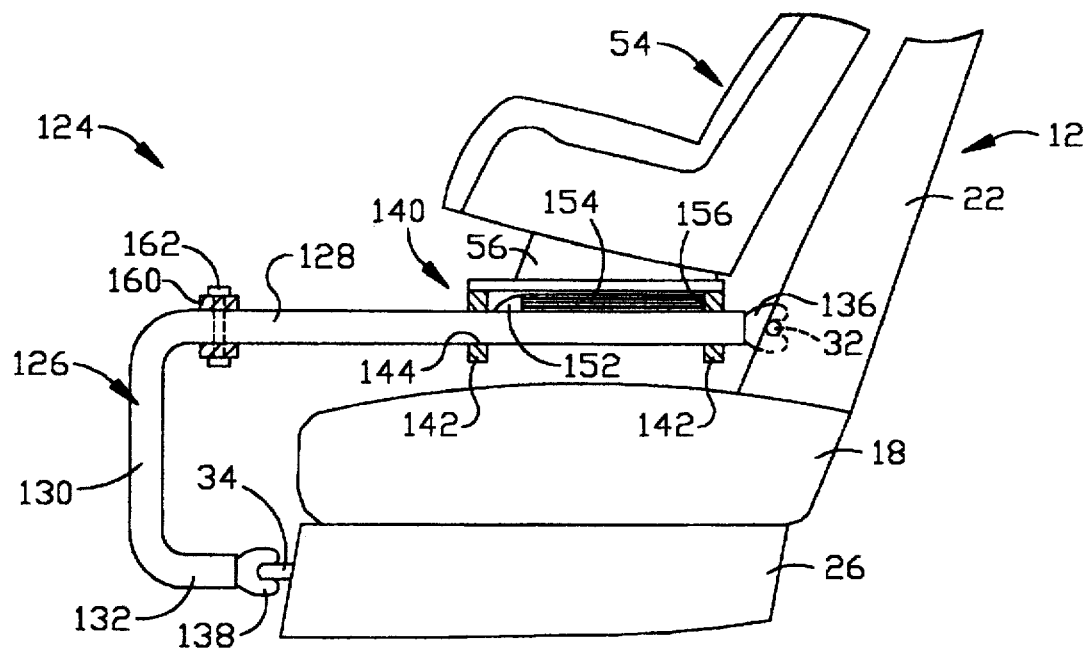
FIG. 4 is a side view, partially in section, of a third embodiment of the present invention.

An apparatus 124 according to a third embodiment of the present invention is shown in FIG. 4. The apparatus 124 is located on a vehicle seat 12 of a vehicle (not shown). The vehicle seat 12 is identical to the vehicle seat described in the discussion of the first embodiment. Accordingly, the same reference numerals are used to identify identical structure.

The apparatus 124 includes two support bars 126 (only one shown). The support bars 126 are identical and only one of the support bars is described, with the understanding that the other support bar has identical structure and identical function. The support bar 126 is made of metal, or other suitable material, and is generally J-shaped. The support bar 126 is located adjacent to the seat bottom 18.

An elongate segment 128 of the support bar 126 is elongate in a direction from front to rear and is cylindrical. The elongate segment 128 extends from a location adjacent to the seat back 22, above the seat bottom 18, to a location above and in front of the seat bottom. The support bar 126 has a first right angle bend at a front end portion of the elongate segment 128.

A vertical segment 130 of the support bar 126 extends downward from the first bend to a location at the level of the seat base 26. The support bar 126 has a second right angle bend at a lower end portion of the vertical segment 130. A lower segment 132 of the support bar 126 extends rearward from the second bend to a location adjacent to the seat base 26.

Attached to a rear end portion of the elongate segment 128 is a first connector 136 (schematically shown). The first connector 136 is locked with the first mounting fixture 32 to fix the support bar 126 relative to the seat back 22. The first connector 136 is identical to the first connector 36 (FIG. 1) of the first embodiment. Accordingly, the first connector 136 (FIG. 4) and the first mounting fixture 32 may be any suitable locking device.

A second connector 138 (schematically shown) is fixed to a rear end portion of the lower segment 132 of the support bar 126. The second connector 138 is locked with the second mounting fixture 34 to fix the support bar 126 relative to the seat base 26. The second connector 138 is identical to the second connector 38 of the first embodiment. Accordingly, the second connector 138 and the second mounting fixture 34 may be any suitable locking device.

The second support bar 126 (not shown) is attached to the vehicle seat 12 in the same manner. The two support bars 126 are spaced apart and are parallel to each other. The support bars 126 are detachable from the vehicle seat 12 when the first and second connectors 136 and 138 are unlocked, to permit use of the vehicle seat 12 by an adult vehicle occupant (not shown).

A child seat 54 is the same as the child seat of the first embodiment, and the child seat is connected to a seat carrier 140. The seat carrier 140 extends between the elongate segments 128 of the two support bars 126. The seat carrier 140 is made of metal or other suitable material. At each side of the seat carrier 140 is a pair of guide rings 142 (only one pair shown). Each pair of guide rings 142 is identical and only one pair of guide rings is discussed in detail, with the understanding that the other pair of guide rings has identical structure and function. One of the guide rings 142 is located at a front end portion of the seat carrier 140 and the other guide ring 142 is located at a rear end portion of the seat carrier.

Each of the guide rings 142 has a cylindrical passage 144 which extends through the guide ring 142. The passages 144 have centers which are aligned in the front to rear direction. Each passage 144 has a diameter which is slightly larger than the outer diameter of the elongate segment 128 of the support bar 126. The guide rings 142 encircle respective portions of the elongate segment 128.

The seat carrier 140 is supported by the support bars 126. The child seat 54 and the child sitting in the child seat are supported on the vehicle seat 12 by the seat carrier 140 and the support bars 126. The seat carrier 140 is slidable along the elongate segments 128. During movement, the elongate segments 128 pass through the guide rings 142.

Two bearing projections 152 (only one shown) are provided on the support bars 76. The bearing projections 152 are identical and only one of the bearing projections is discussed, with the understanding that the other bearing projection has the same structure and function. The bearing projection 152 is fixed to the respective elongate segment 128 by a suitable fastening device (not shown). The bearing projection 152 is located beneath the seat carrier 140 adjacent to the front one of the guide rings 142 when the seat carrier 140 is located adjacent to the seat back 22 of the vehicle seat 12. The bearing projection 152 may have any suitable shape, so long as the bearing projection 152 has a rearwardly facing surface against which a force can be applied.

The apparatus 124 has two pieces of sacrificial material 154 (only one shown). The two pieces of sacrificial material 154 are identical, and only one of the pieces of sacrificial material is discussed, with the understanding that the other piece of sacrificial material has the same structure and function. The piece of sacrificial material 154 is elongate in the front to rear direction and extends along a portion of the elongate segment 128. The piece of sacrificial material 154 is located on top of the elongate segment 128 and is located beneath the seat carrier 140. A front end of the piece of sacrificial material 154 abuts the rearward facing surface of the bearing projection 152 and a rear end of the piece of sacrificial material abuts a bearing surface 156 on the rear guide ring 142. The piece of sacrificial material 154 is held in place on the elongate segment 128 and between the bearing projection 152 and the rear guide ring 142 by suitable means (not shown), such as mechanical fasteners, adhesive, or guides.

The sacrificial material is crushable, but has a structure which provides a constant resistance to being crushed. Preferably, the sacrificial material includes elongate cells which extend parallel to the front to rear direction and have a predefined linear crush resistance. Also, preferably, the cells are arranged in a honeycomb configuration. Each cell buckles locally, wrinkling in an accordion fashion, along its extent. The sacrificial material is preferably a commercially available honeycomb material identified as Standard Core and marketed by Hexcel Corp. of Dublin, Calif.

The apparatus 124 includes two annular stop collars 160 (only one shown). Each stop collar 160 is located adjacent to the front end portion of the elongate segment 128 of a respective support bar 126. The stop collars 160 are fixed on the support bars 126 with suitable fasteners 162.

When a child (not shown) is to be transported in a vehicle, the apparatus 124 is secured onto the vehicle seat 12 in a manner identical to the securing of the first embodiment. The child is secured within the child seat 54 in a manner identical to that for the first embodiment.

The child seat 54 is located near the seat back 22, and the pieces of sacrificial material 154 are in their uncrushed state. The pieces of sacrificial material 154 prevent movement of the seat carrier 140 relative to the support bars 126 during normal vehicle travel because the sacrificial material has a sufficient resistance to being crushed.

Upon the occurrence of a vehicle collision, the vehicle is suddenly decelerated. The seat carrier 140 is urged to move forward along the support bars 126 because of the inertia of the seat carrier, the child seat 54 and the child sitting in the child seat. The bearing surfaces 156 press against the pieces of sacrificial material 154. If the force with which the bearing surfaces 156 bear upon the pieces of sacrificial material 154 is below a predetermined amount, the pieces of sacrificial material are not crushed. Accordingly, the pieces of sacrificial material 154 prevent forward movement of the seat carrier 140 along the elongate segments 128 of the support bars 126.

If the force with which the bearing surfaces 156 bear upon the pieces of sacrificial material 154 is above the predetermined amount, the pieces of sacrificial material are crushed and compressed between the bearing projections 152 and the bearing surfaces 156. The child seat 54 and the child are permitted to move forward relative to the vehicle seat 12. The seat carrier 140 can move along the elongate segment 128 until the front guide rings 142 abut against the stop collars 160. The stop collars 160 stop the forward stroke of the seat carrier 140.

The crushing of the pieces of sacrificial material 154 is not instantaneous but instead occurs over a period of time and results in a reapportionment of the work to decelerate the child over this time period. Deceleration of the child is less abrupt than it would be if the child seat 54 and the child were not permitted to move forward. Further, the pieces of sacrificial material 154 absorb energy during the crushing and a lesser amount of the child's energy is physically absorbed by the child than if the above-discussed movement did not occur.

Figure 5:
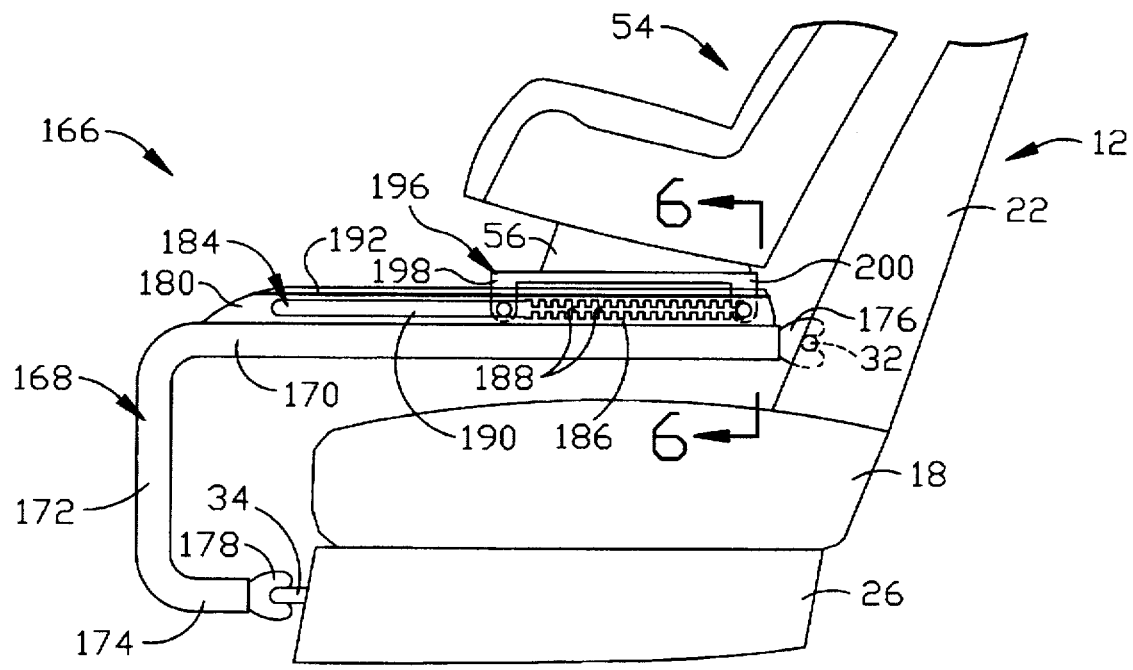
FIG. 5 is a side view of a fourth embodiment of the present invention.

An apparatus 166 according to a fourth embodiment of the present invention is shown in FIG. 5. The apparatus 166 is located on a vehicle seat 12 of a vehicle (not shown). The vehicle seat 12 is identical to the vehicle seat described with reference to the first embodiment. Accordingly, the same reference numerals are used to identify identical structure.

The apparatus 166 includes two support bars 168 (only one shown). The support bars 168 are identical to each other and only one of the support bars is described, with the understanding that the other support bar has identical structure and identical function. The support bar 168 is made of metal, or other suitable material, and is generally J-shaped. The support bar 168 is located adjacent to the seat bottom 18.

An elongate segment 170 of the support bar 168 is elongate in a direction from front to rear. The elongate segment 170 extends from a location adjacent to the seat back 22, above the seat bottom 18, and to a location above and in front of the seat bottom. A first right angle bend of the support bar 168 is at a front end portion of the elongate segment 170. A vertical segment 172 of the support bar 168 extends downward from the first bend to a location at the level of the seat base 26. The support bar 168 has a second right angle bend at a lower end portion of the vertical segment 172. The support bar 168 has a lower segment 174 which extends rearward from the second bend to a location adjacent to the seat base 26.

Attached to a rear end portion of the elongate segment 170 is a first connector 176 (schematically shown). The first connector 176 is locked with the first mounting fixture 32 to fix the support bar 168 relative to the seat back 22. The first connector 176 is identical to the first connector 36 (FIG. 1) of the first embodiment. Accordingly, the first connector 176 (FIG. 5) and the first mounting fixture 32 may be any suitable locking device, such as an interengaging pin and receptacle device.

A second connector 178 (schematically shown) is fixed to a rear end portion of the lower segment 174 of the support bar 168. The second connector 178 is locked with the second mounting fixture 34 to fix the support bar 168 relative to the seat base 26. The second connector 178 is identical to the second connector 38 of the first embodiment. Accordingly, the second connector 178 and the second mounting fixture 34 may be any suitable locking device.

The second support bar 168 (not shown) is attached to the vehicle seat 12 in the same manner. The support bars 168 are spaced apart, parallel to each other. The support bars 168 are detachable from the vehicle seat 12 when the first and second connectors 176 and 178 are unlocked, to permit use of the vehicle seat 12 by an adult vehicle occupant (not shown).

The elongate segment 170 of each support bar 168 has a rib 180 (only the rib for the first support bar is shown). The ribs 180 are identical and only one of the ribs is discussed in detail, with the understanding that identical structure and function are present for the other rib. Preferably, the rib 180 is made of metal. The rib 180 is located on a top side of the elongate segment 170 and extends along a majority of the elongate segment.

Figure 6:
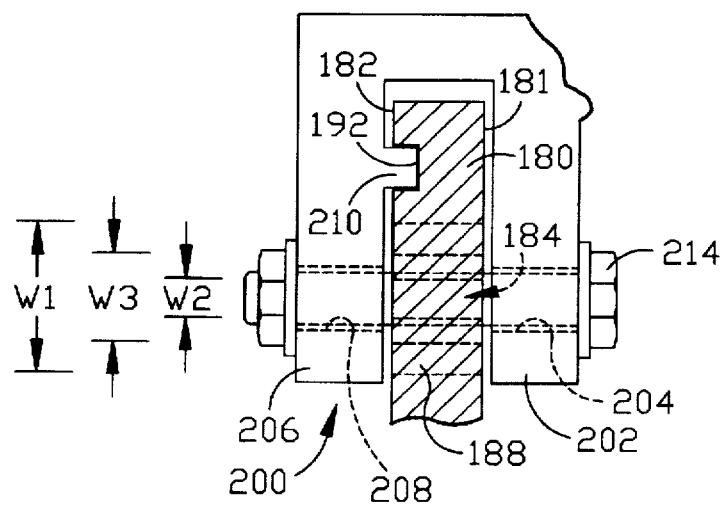
FIG. 6 is an enlarged view taken along line 6—6 in FIG. 5, partially broken away.

The rib 180 has two flat sides 181 and 182 (FIG. 6) which extend along the length of the rib. The sides 181 and 182 are designated inboard and outboard, respectively. A thickness of the rib 180 is measured between the inboard and outboard sides 181 and 182.

A slot 184 extends through the rib 180 from the inboard side 181 to the outboard side 182. The slot 184 (FIG. 5) is elongate and extends along a majority of the length of the rib 180. The slot 184 has a first section 186 located at a rear half of the slot. A plurality of projections 188 are arranged in an array at the first section 186. The projections 188 extend into the slot 184 and are teeth-like. The projections 188 are deformable or bendable under the influence of a predetermined amount of force.

The projections 188 are divided into two groups. One group of projections 188 extends downward into the slot 184 from a upper edge of the slot. The other group of projections 188 extends upward into the slot 184 from a lower edge of the slot. The projections 188 are arranged in pairs and the ends of each pair of projections oppose each other across a narrow gap. The slot 184 has a width W1 (FIG. 6), measured from top to bottom, at the base of the projections 188 and a smaller width W2, measured from top to bottom, at the gap between the opposed ends of each pair of projections 188.

The slot 184 has a second section 190 (FIG. 5) located at a front half of the slot. The upper and lower surfaces of the rib 180 which define the second section 190 are smooth and parallel. The slot 184 has a constant width W3 (FIG. 6), measured from top to bottom, along the length of the second section 190. The width W3 is less than the width W1 and is greater than the width W2.

A groove 192 extends into the material of the rib 180 from the outboard side 182 of the rib. The groove 192 is located above the slot 184 and is parallel to the slot. The groove 192 extends along the entire length of the rib 180 and has a rectangular or square profile when viewed along the front to rear direction.

A child seat 54 is the same as the child seat of the first embodiment, and the child seat is connected to a seat carrier 196. The seat carrier 196 extends between the two elongate segments 170 of the two support bars 168. The seat carrier 196 is made of metal or other suitable material. At each side of the seat carrier 196 is a pair of guide brackets 198 and 200 (only one pair shown). Each pair of guide brackets 198 and 200 is identical and only one pair of guide brackets is discussed in detail, with the understanding that the other pair of guide brackets has identical structure and function. The guide bracket 198 is located at a front end portion of the seat carrier 196 and the guide bracket 200 is located at a rear end portion of the seat carrier. The two guide brackets 198 and 200 are similar and only the structure of the guide bracket 200 is discussed in detail.

The guide bracket 200 has a first limb 202 (FIG. 6) which extends downward from the seat carrier 196 and along the inboard side 181 of the rib 180. A hole 204 extends through the first limb 202 in a direction perpendicular to the front to rear direction. A second limb 206 of the guide bracket 200 extends downward from the seat carrier 196 and along the outboard side 182 of the rib 180. The first and second limbs 202 and 206 are parallel to each other and are spaced apart a distance which is slightly greater than the thickness of the rib 180. A hole 208 extends through the second limb 206 in the direction perpendicular to the front to rear direction. The holes 204 and 208 are aligned.

A projection 210 extends from the second limb 206 towards the first limb 202 and into the space between the first and second limbs. The projection 210 has a rectangular or square profile when viewed along the front to rear direction. The shape of the profile of the projection 210 is generally the same as the shape of the profile of the groove 192 in the rib 180. The projection, however, has a height which is slightly less than the height of the groove. The projection 210 is located above the hole 208 and is located within the groove 192. The seat carrier 196 is supported on the rib 180 by the projection 210. The child seat 54 and the child sitting in the child seat are supported on the vehicle seat 12 by the seat carrier 196 and the support bars 168.

A pin 214 extends through the aligned holes 204 and 208 and through the slot 184. The pin 214 may have any suitable construction, for example, the pin may be a bolt and nut combination. The portion of the pin 214 within the slot 184 has a width greater than the width W2 and less than the width W3. The pin 214 remains centered in the slot 184 because the projection 210 maintains the guide bracket 200 in a vertical position relative to the rib 180.

The guide brackets 198 and 200 are slidable along the rib 180. Initially, the guide bracket 198 is located at a rear end of the second section 190 of the slot 184 and the guide bracket 200 is located at a rear end of the first section 186 of the slot. The pin 214 of the guide bracket 198 may readily move forward along the second section 190 without hinderance. However, the projections 188 in the first section 186 are resistant to deformation and thus inhibit forward movement of the pin 214 of the guide bracket 200.

When a child (not shown) is to be transported in a vehicle, the apparatus 166 is secured onto the vehicle seat 12 in a manner identical to the securing of the apparatus of the first embodiment. The child is secured within the child seat 54 in a manner identical to that for the first embodiment. The child seat 54 is located near the seat back 22. The pins 214 of each guide bracket 200 are located at the rear end of the first section 186 and engage a rear pair of the projections 188. The rear pair of projections 188 prevent movement of the seat carrier 196 along the support bars 168 during normal vehicle travel because of the resistance to deformation of the projections.

Upon the occurrence of a vehicle collision, the vehicle is suddenly decelerated. The seat carrier 196 is urged along the support bars 168 because of the inertia of the seat carrier 196, the child seat 54 and the child sitting in the child seat. The pins 214 of the guide brackets 200 press and bear upon the rear pair of projections 188 in the respective slots 184. If the force with which the pins 214 bear upon the rear pair of projections 188 is below a predetermined amount, the projections do not deform and the pins cannot move along the slots 184. Accordingly, the projections 188 prevent forward movement of the seat carrier 196 along the support bars 168.

If the force with which the pins 214 bear upon the projections 188 is above the predetermined amount, the projections 188 deform and bend out of the way of the pins. Specifically, the projections 188 are curled over. The downwardly extending projections 188 are curled forward and upward, and the upwardly extending projections 188 are curled forward and downward.

As the projections 188 bend out of the way of the pins 214, the pins are permitted to move forward along the slots 184. The projections 188 are sized and spaced from each other such that as each pair of projections is bent sufficiently far to permit passage of the pin 214 of the respective guide bracket 200, the pin is already in engagement with the subsequent pair of projections. Accordingly, the movement of the pins 214 through the first sections 186 of the slots 184 is smooth and at a constant resistance.

During movement, the pins 214 remain vertically centered in the slots 184 because the projections 210 slide along the grooves 192 and maintain the guide brackets 198 and 200 at predetermined vertical positions relative to the ribs 180. Accordingly, as each guide bracket 200 moves along the respective rib 180, the pin 214 of the guide bracket equally bears upon the two projections 188 of each successive pair of projections.

As the pins 214 of the guide brackets 200 move along the first sections 186, the pins 214 of the guide brackets 198 slide along the second section 190 without hinderance. When the pins 214 abut the front ends of the slots 184, the forward stroke of the seat carrier 196 is stopped.

The deceleration of the child occurs over a longer period of time and is less abrupt than if the child seat 54 and the child were not permitted to move relative to the vehicle seat 12. Energy is absorbed by the projections 188 upon deformation. The energy which is absorbed by the projections 188 includes energy which would otherwise be physically absorbed by the child.

Figure 7:
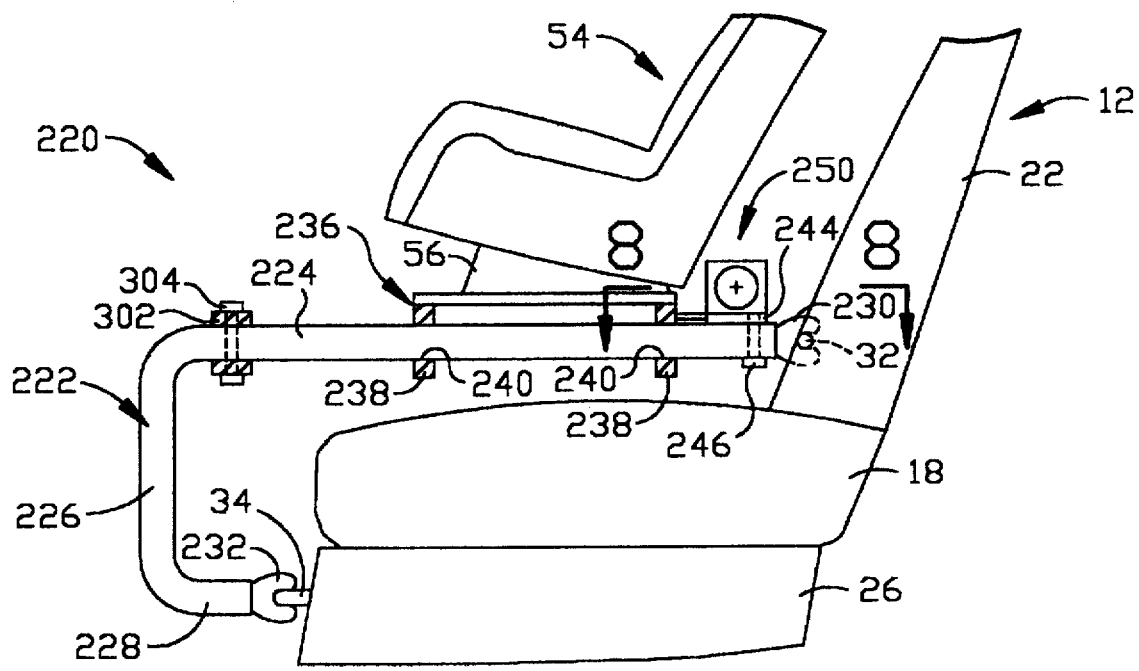
FIG. 7 is a side view, partially in section, of a fifth embodiment of the present invention.

An apparatus 220 according to a fifth embodiment of the present invention is shown in FIG. 7. The apparatus 220 is located on a vehicle seat 12 of a vehicle (not shown). The vehicle seat 12 is identical to the vehicle seat described in the discussion of the first embodiment. Accordingly, the same reference numerals are used to identify identical structure.

The apparatus 220 includes two support bars 222 (only one shown). The support bars 222 are identical and only one of the support bars is described, with the understanding that the other support bar has identical structure and function. The support bar 222 is made of metal, or other suitable material, and is generally J-shaped. The support bar 222 is located adjacent to the seat bottom 18.

An elongate segment 224 of the support bar 222 is elongate in a direction from front to rear and is cylindrical. The elongate segment 224 extends from a location adjacent to the seat back 22, above the seat bottom 18, to a location above and in front of the seat bottom. The support bar 222 has a first right angle bend at a front end portion of the elongate segment 224.

A vertical segment 226 of the support bar 222 extends downward from the first bend to a location at the level of the seat base 26. The support bar 222 has a second right angle bend at a lower end portion of the vertical segment 226. A lower segment 228 of the support bar 222 extends rearward from the second bend to a location adjacent to the seat base 26.

Attached to a rear end portion of the elongate segment 224 is a first connector 230 (schematically shown). The first connector 230 is locked with the first mounting fixture 32 to fix the support bar 222 relative to the seat back 22. The first connector 230 is identical to the first connector 36 (FIG. 1) of the first embodiment. Accordingly, the first connector 230 (FIG. 7) and the first mounting fixture 32 may be any suitable locking device.

A second connector 232 (schematically shown) is fixed to a rear end portion of the lower segment 228. The second connector 232 is locked with the second mounting fixture 34 to fix the support bar 222 relative to the seat base 26. The second connector 232 is identical to the second connector 38 of the first embodiment. Accordingly, the second connector 232 and the second mounting fixture 34 may be any suitable mounting device.

The second support bar 222 (not shown) is attached to the vehicle seat 12 in the same manner. The two support bars 222 are spaced apart and are parallel to each other. The support bars 222 are detachable from the vehicle seat 12 when the first and second connectors 230 and 232 are unlocked, to permit use of the vehicle seat 12 by an adult vehicle occupant (not shown).

A child seat 54 is the same as the child seat of the first embodiment, and the child seat is connected to a seat carrier 236. The seat carrier 236 extends between the elongate segments 224 of the two support bars 222. The seat carrier 236 is made of metal or other suitable material. At each side of the seat carrier 236 is a pair of guide rings 238 (only one shown). Each pair of guide rings 238 is identical and only one pair of guide rings is discussed in detail, with the understanding that the other pair of guide rings has identical structure and function. One of the guide rings 238 is located at a front end portion of the seat carrier 236 and the other guide ring 238 is located at a rear end portion of the seat carrier.

Each of the guide rings 238 has a cylindrical passage 240 which extends through the guide ring. The passages 240 have centers which are aligned along the front to rear direction. Each passage 240 has a diameter which is slightly larger than the outer diameter of the elongate segment 224 of the support bar 222. The guide rings 238 encircle respective portions of the elongate segment 224.

The seat carrier 236 is supported by the support bars 222. The child seat 54 and the child sitting in the child seat are supported on the vehicle seat 12 by the seat carrier 236 and the support bars 222. The seat carrier 236 is slidable along the elongate segments 224. During movement, the elongate segments 224 pass through the guide rings 238.

The apparatus 220 includes a cross plate 244 extending between the elongate segments 224 of the two support bars 222. The cross plate 244 is located adjacent to the seat back 22. A plurality of fasteners 246 (only one shown) secure the cross plate 244 to the support bars 222. The fasteners 246 may be any suitable type, such as screws or rivets.

Figure 8:
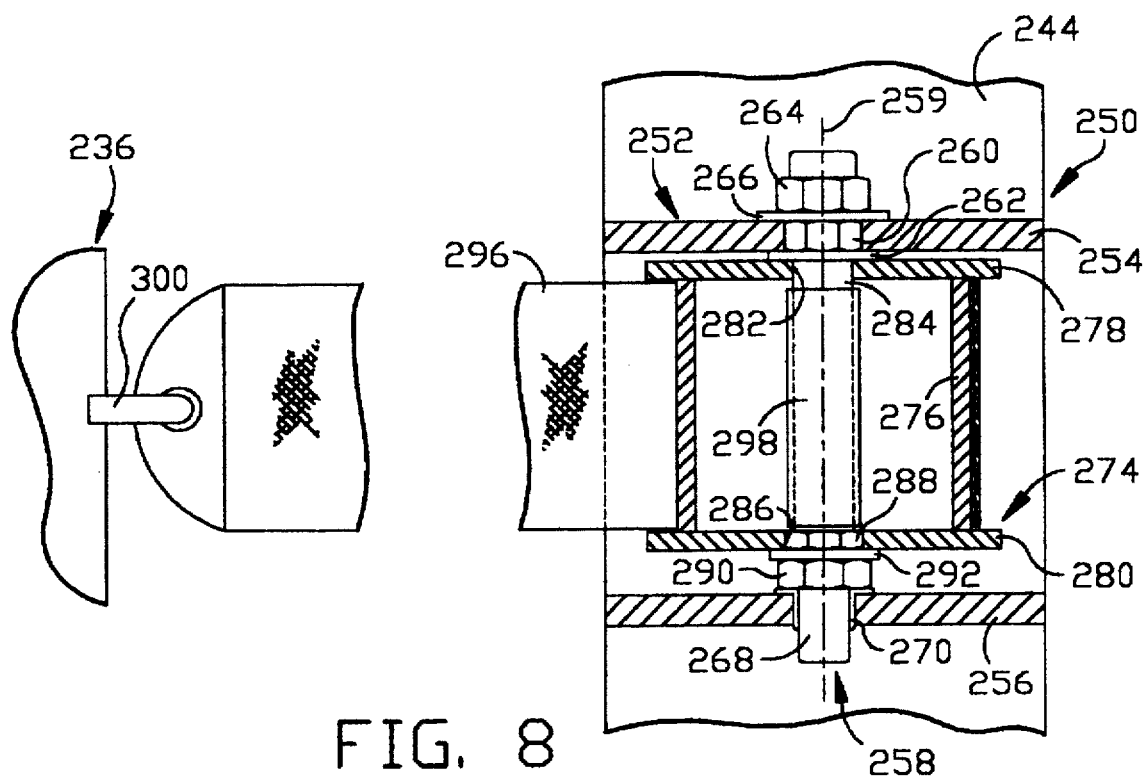
FIG. 8 is an enlarged view taken along line 8—8 in FIG. 7, partially broken away.

A payout device 250 is located on the cross plate 244. Preferably, the payout device 250 is centered between the two support bars 222. The payout device 250 (FIG. 8) includes a frame 252 which is preferably metal and which is secured to the cross plate 244 with suitable fasteners (not shown). The frame 252 has a general U-shape and has a pair of opposed side walls 254 and 256.

A torsion rod 258 of the payout device 250 is elongate along an axis 259 and extends between the two side walls 254 and 256 of the frame 252. The torsion rod 258 is made of metal or other suitable material and has a predetermined deformation characteristic which permits relative rotation or twisting between its two ends. A hexagonal-shaped portion 260 of the torsion rod 258 is adjacent to one end portion of the torsion rod and is fitted within a hexagonal opening in the side wall 254.

A shoulder 262 of the torsion rod 258 is adjacent to the hexagonal portion 260 and engages an inboard face of the side wall 254. A lock nut 264 and a washer 266 are located on the end portion of the torsion rod 258 adjacent to an outboard face of the side wall 254'. The lock nut 264 and the shoulder 262 prevent axial movement of the torsion rod 258. The inter-fit of the hexagonal portion 260 of the torsion rod 258 and the hexagonal opening in the side wall 254 prevents rotation of the hexagonal portion 260 about the axis 259. Accordingly, the hexagonal portion 260 is stationary relative the frame 252, the cross plate 244 and the support bars 222.

The torsion rod 258 has a cylindrical portion 284 adjacent to the shoulder 262 and extending away from the shoulder towards a cylindrical end portion 268 of the torsion rod 258. The cylindrical end portion 268 extends through the side wall 256 of the frame 252 and is supported by a bushing 270 in the side wall 256. The cylindrical end portion 268 is rotatable about the axis 259 relative to the side wall 256 of the frame 252. A hexagonal-shaped portion 288 of the torsion rod 258 is adjacent to the cylindrical end portion 268 and between the cylindrical end portion 268 and the cylindrical portion 284.

A spool assembly 274 of the payout device 250 is located on the torsion rod 258. The spool assembly 274 includes a sleeve 276 which is concentric about the axis 259. Two disks 278 and 280 of the spool assembly 274 are located at opposite ends of the sleeve 276. The disks 278 and 280 are fixed to the sleeve 276 by suitable fastening means (not shown). The disk 278 is adjacent to the side wall 254 and has a circular hole 282 through which the cylindrical portion 284 of the torsion rod 258 extends. The disk 278 can rotate about the axis 259 relative to the cylindrical portion 284 of the torsion rod 258.

The disk 280 is adjacent to the side wall 256 and has a hexagonal-shaped hole 286 through which the hexagonal portion 288 of the torsion rod 258 extends. The disk 280 is fixed to rotate with the hexagonal portion 288 of the torsion rod 258 because of the interfit of the hexagonal portion and the surfaces defining the hexagonal-shaped hole 286. A lock nut 290 and a washer 292 are located on the torsion rod 258 adjacent to the disk 280. The lock nut 290 holds the spool assembly 274 against axial movement. The spool assembly 274 is fixed to rotate with the hexagonal portion 288 of the torsion rod 258 and the spool assembly is rotatable relative to the hexagonal portion 260 of the torsion rod 258 and the frame 252.

A length of flexible webbing 296 is associated with the spool assembly 274. One end of the webbing 296 is fixed to the spool assembly 274. Specifically, the end of webbing 296 extends through a slot (not shown) in the sleeve 276 and is sewn into a loop 298 about the torsion rod 258. The webbing 296 extends from the slot in the sleeve 276 and is coiled around the sleeve. The other end of the webbing 296 extends from the spool assembly 274 toward the seat carrier 236. A connector 300 is attached to the end of the webbing 296 and is attached to the seat carrier 236. During normal vehicle travel, the seat carrier 236 is located adjacent to the payout device 250 and most of the webbing 296 is coiled about the spool assembly 274.

At the forward end of each of the elongate segments 224, away from the payout device 250, is an annular stop collar 302 (only one shown). Each stop collar 302 is secured to the respective support bar 222 with a suitable fastener 304.

When a child (not shown) is to be transported in a vehicle, the apparatus 220 is secured onto the vehicle seat in a manner identical to the securing of the first embodiment. The child is secured within the child seat 54 in a manner identical to that for the first embodiment. The child seat 54 is located near the seat back 22.

Upon the occurrence of a vehicle collision, the vehicle is suddenly decelerated. The seat carrier 236 is urged along the support bars 222 because of the inertia of the seat carrier, the child seat 54 and the child sitting in the child seat. A tension force is created in the webbing 296 which tends to rotate the spool assembly 274. The spool assembly 274 transmits a rotational force (torque) to the hexagonal portion 288 of the torsion rod 258. The cylindrical end portion 268 of the torsion rod 258 is urged to rotate about the axis 259 relative to the frame 252.

If the torque applied to the torsion rod 258 is below a predetermined amount, the torsion rod does not deform, and the hexagonal portion 288 and the spool assembly 274 do not rotate relative to the frame 252. Accordingly, the webbing 296 is not permitted to uncoil or payout from the payout device 250. The seat carrier 236 does move forward along the elongate segments 224.

If the torque applied to the torsion rod 258 is above the predetermined amount, the torsion rod 258 deforms by twisting. Specifically, the cylindrical end portion 268 and the hexagonal portion 288 rotate about the axis 259 relative to the hexagonal portion 260 fixed to the frame 252. Preferably, the hexagonal portion 288 can rotate at least one revolution relative to the hexagonal portion 260.

The spool assembly 274 rotates with the hexagonal portion 288 of the torsion rod 258. The webbing 296 uncoils and is paid out from the spool assembly 274. The length of the webbing 296 which extends between the payout device 250 and the seat carrier 236 increases and the seat carrier moves forward. The seat carrier 236 can move forward until the stop collars 302 stop the forward stroke.

The deceleration of the child occurs over a longer period of time and is less abrupt than if the child seat 54 and the child were not permitted to move. Energy is absorbed by the torsion rod 258 as the torsion rod is deformed. Less energy is physically absorbed by the child.

Figure 9:
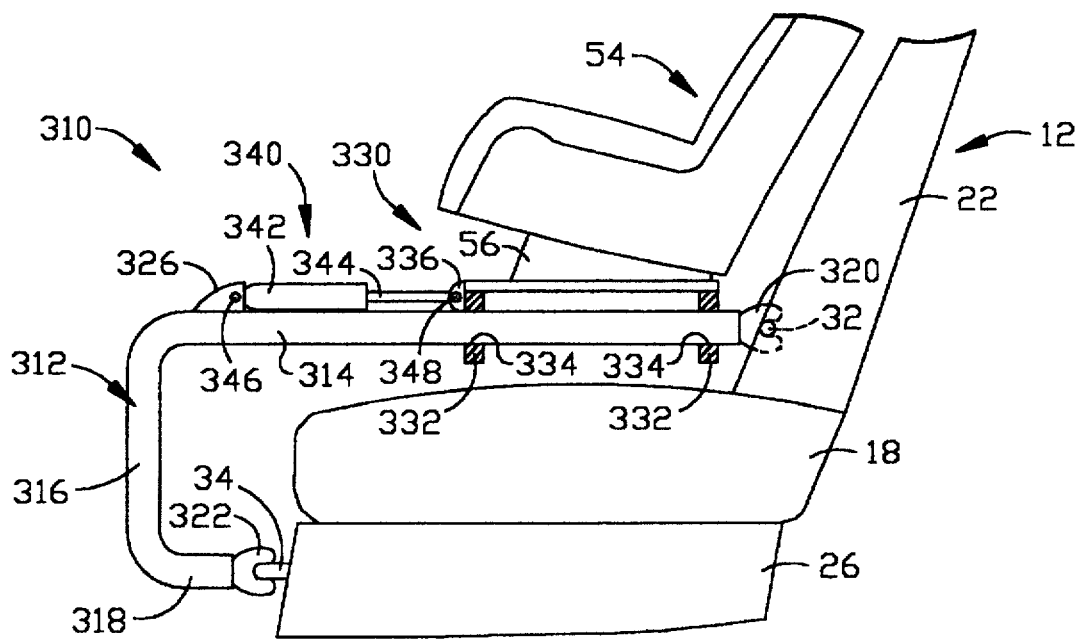
FIG. 9 is a side view, partially in section, of a sixth embodiment of the present invention.

An apparatus 310 according to a sixth embodiment of the present invention is shown in FIG. 9. The apparatus 310 is located on a vehicle seat 12 of a vehicle (not shown). The vehicle seat 12 is identical to the vehicle seat described in the discussion of the first embodiment. Accordingly, the same reference numerals are used to identify identical structure.

The apparatus 310 includes two support bars 312 (only one shown). The support bars 312 are identical to each other and only one of the support bars is described, with the understanding that the other support bar has identical structure and function. The support bar 312 is made of metal, or other suitable material, and is generally J-shaped. The support bar 312 is located adjacent to the seat bottom 18.

An elongate segment 314 of the support bar 312 is elongate in a direction from front to rear and is cylindrical. The elongate segment 314 extends from a location adjacent to the seat back 22, above the seat bottom 18, to a location above and in front of the seat bottom. A first right angle bend of the support bar 312 is at a first end portion of the elongate segment 314. A vertical segment 316 of the support bar 312 extends downward from the first bend to a location at the level of the seat base 26. The support 312 has a second right angle bend at a lower end portion of the vertical segment 316. The support bar 312 has a lower segment 318 which extends rearward from the second bend to a location adjacent to the seat base 26.

A projection 326 is located on the elongate segment 314. The projection 326 is near the front end portion of the elongate segment 314 and is located on top of the elongate segment. The projection 326 may be a separate part connected to the support bar 312 by a suitable fastener means (not shown). Alternatively, the projection 326 may be formed as one piece with the rest of the support bar 312.

Attached to the rear end portion of the elongate segment 314 is a first connector 320 (schematically shown). The first connector 320 is locked with the first mounting fixture 32 to fix the support bar 312 relative to the seat back 22. The first connector 320 is identical to the first connector 36 (FIG. 1) of the first embodiment. Accordingly, the first connector 320 (FIG. 9) and the first mounting fixture 32 may be any suitable locking device, such as an interengaging pin and receptacle device.

A second connector 322 (schematically shown) is fixed to the rear end portion of the lower segment 318. The second connector 322 is locked with the second mounting fixture 34 to fix the support bar 312 relative to the seat base 26. The second connector 322 is identical to the second connector 38 of the first embodiment. Accordingly, the second connector 322 and the second mounting fixture 34 may be any suitable locking device.

The second support bar 312 (not shown) is attached to the vehicle seat 12 in the same manner. The two support bars 312 are spaced apart, parallel to each other. The support bars 312 are detachable from the vehicle seat 12 when the first and second connectors 320 and 322 are unlocked, to permit use of the vehicle seat 12 by an adult vehicle occupant (not shown).

A child seat 54 is the same as the child seat of the first embodiment, and the child seat is connected to a seat carrier 330. The seat carrier 330 extends between the elongate segments 314 of the two support bars 312. The seat carrier 330 is made of metal or other suitable material. At each side of the seat carrier 330 is a pair of guide rings 332 (only one pair shown). Each pair of guide rings 332 is identical and only one pair of guide rings is discussed in detail, with the understanding that the other pair of guide rings has identical structure and function. One of the guide rings 332 is located at a front end portion of the seat carrier 330 and the other guide ring is located at a rear end portion of the seat carrier.

A cylindrical passage 334 extends through each of the guide rings 332. Each passage 334 has a diameter which is slightly larger than the outer diameter of the elongated segment 314 of the support bar 312. The guide rings 332 encircle respective portions of the elongate segment 314. The seat carrier 330 is supported by the support bars 312. The child seat 54 and the child sitting in the child seat are supported on the vehicle seat 12 by the seat carrier 330 and the support bats 312. The seat carrier 330 is slidable along the elongate segments 314. During movement, the elongate segments 314 pass through the guide rings 332.

A tab 336 is located at each of the front end corners of the seat carrier 330 (only one tab shown). Each tab 336 is located above a respective elongate segment 314 and faces toward the projection 326 on the elongate segment.

The apparatus 310 includes two shock absorber assemblies 340 (only one shown). The two shock absorber assemblies 340 are identical and only one of the shock absorber assemblies 340 is discussed in detail, with the understanding that the other shock absorber assembly has identical structure and function. The shock absorber assembly 340 includes a cylinder 342 and piston 344. The cylinder 342 is attached to the projection 326 on the support bar 312 by a connector 346. The piston 344 is attached to the tab 336 on the seat carrier 330 by a connector 348.

A chamber (not shown) is defined within the cylinder 342. A head (not shown) of the piston 344 is located within the cylinder 342 and defines one end of the chamber. The piston 344 is movable into the cylinder 342. During movement of the piston 344 into the cylinder 342, the head of the piston is moved to decrease the volume of the chamber.

A fluid (not shown) is located within the chamber to resist movement of the piston 344. The fluid may be any suitable type of fluid, and the cylinder 342 may have suitable additional structure (not shown). For example, the fluid may be compressible, and the fluid may be sealed within the chamber. Alternatively, the fluid may have a predetermined viscosity, and the cylinder 342 or the piston 344 may have a restrictive orifice to permit flow of the fluid out of the chamber.

When a child (not shown) is to be transported in a vehicle, the apparatus 310 is secured onto the vehicle seat 12 in a manner identical to the securing of the first embodiment. The child is secured within the child seat 54 in a manner identical to that for the first embodiment. The child seat 54 is located near the seat back 22 and piston 344 is fully extended from the cylinder 342.

Upon the occurrence of a vehicle collision, the vehicle is suddenly decelerated. The seat carrier 330 is urged forward along the support bars 312 because of the inertia of the seat carrier, the child seat 54 and the child sitting in the child seat. The head of the piston 344 presses against the fluid within the cylinder. The fluid is compressed and/or displaced out of the chamber. The overall length of the shock absorber assembly 340 is compressed, and the child seat 54 and the child move forward relative to the vehicle seat 12. The seat carrier 330 can move until the piston 344 bottoms out within the cylinder 342.

The deceleration of the child occurs over a longer period of time and is less abrupt than if the child seat 54 and the child were not permitted to move. Energy is absorbed by the shock absorber assemblies 340 because of the compression and/or the displacement of the fluid and less energy is physically absorbed by the child.

Figure 10:
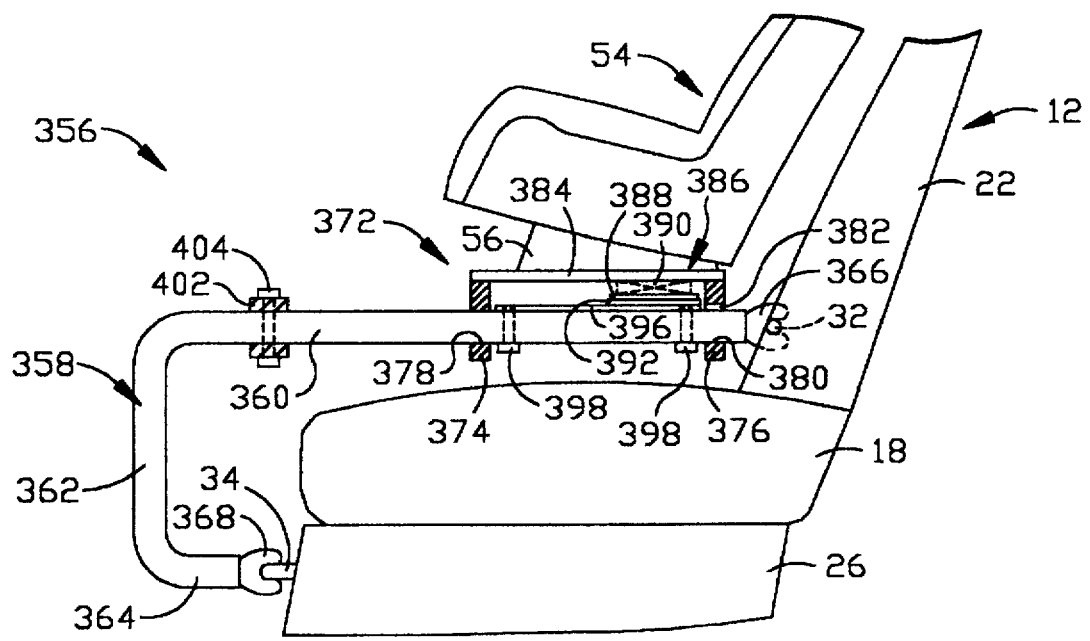
FIG. 10 is a side view, partially in section of a seventh embodiment of the present invention.

An apparatus 356 according to a seventh embodiment of the present invention is shown in FIG. 10. The apparatus 356 is located on a vehicle seat 12 of a vehicle (not shown). The vehicle seat 12 is identical to the vehicle seat 12 described with reference to the first embodiment. Accordingly, the same reference numerals are used to identify identical structure.

The apparatus 356 includes two support bars 358 (only one shown). The support bars 358 are identical to each other and only one of the support bars is described, with the understanding that the other support bar has identical structure and function. The support bar 358 is made of metal, or other suitable material, and is generally J-shaped. The support bar 358 is located adjacent to the seat bottom 18.

An elongate segment 360 of the support bar 358 is elongate in a direction from front to rear and is cylindrical. The elongate segment 360 extends from a location adjacent to the seat back 22, above the seat bottom 18, to a location above and in front of the seat bottom. A first right angle bend of the support bar 358 is at a first end portion of the elongate segment 360. A vertical segment 362 extends downward from the first bend to a location at the level of the seat base 26. The support bar 358 has a second right angle bend at a lower end portion of the vertical segment 362. The support bar 358 has a lower segment 364 which extends rearward from the second bend to a location adjacent to the seat base 26.

Attached to the rear end portion of the elongate segment 360 is a first connector 366 (schematically shown). The first connector 366 is locked with the first mounting fixture 32 to fix the support bar 358 relative to the seat back 22. The first connector 366 is identical to the first connector 36 (FIG. 1) of the first embodiment. Accordingly, the first connector 366 (FIG. 10) and the first mounting fixture 32 may be any suitable locking device, such as an interengaging pin and receptacle device.

A second connector 368 (schematically shown) is fixed to the rear end portion of the lower segment 364 of the support bar 358. The second connector 368 is locked with the second mounting fixture 34 to fix the support bar 358 relative to the seat base 26. The second connector 368 is identical to the second connector 38 of the first embodiment. Accordingly, the second connector 368 and the second mounting fixture 34 may be any suitable locking device.

The second support bar 358 (not shown) is attached to the vehicle seat 12 in the same manner. The two support bars 358 are spaced apart, parallel to each other. The support bars 358 are detachable from the vehicle seat 12 when the first and second connectors 366 and 368 are unlocked, to permit use of the vehicle seat 12 by an adult vehicle occupant.

A child seat 54 is the same as the child seat of the first embodiment, and the child seat is connected to a seat carrier 372. The seat carrier 372 extends between the elongate segments 360 of the two support bars 358. The seat carrier is made of metal or other suitable material. At each side of the seat carrier 372 is a pair of guide rings 374 and 376 (only one pair shown). Each pair of the guide rings 374 and 376 is identical and only one pair of the guide rings is discussed in detail, with the understanding that the other pair of the guide rings has identical structure and function. The guide ring 374 is located at a front end portion of the seat carrier 372 and the guide ring 376 is located at a rear end portion of the seat carrier.

A cylindrical passage 378 extends through the guide ring 374. A passage 380 extends through the guide ring 376. The passage 380 is cylindrical with a cut out notch 382 extending along an upper side. The notch 382 projects radially out, beyond the cylindrical portion of the passage 380. The passages 378 and 380 have centers which are aligned along the front to rear direction.

The cylindrical diameters of the passage 378 and the passage 380 are equal and slightly greater than the outer diameter of the elongate segment 360. The guide rings 374 and 376 encircle respective portions of the elongate segment 360. The seat carrier 372 is supported by the support bars 358. The child seat 54 and the child sitting in the child seat are supported on the vehicle seat 12 by the seat carrier 372 and the support bars 358. The seat carrier 372 is slidable along the elongate segments 360. During movement, the elongate segments 360 pass through the guide rings 374 and 376.

The seat carrier 372 includes a top plate 384. Two pressure devices 386 (only one shown, schematically) are attached to a lower surface of the top plate 384. Each pressure device 386 is identical and only one of the pressure devices is discussed in detail, with the understanding that the other pressure device has similar structure and function.

The pressure device 386 is located above a respective elongate segment 360, adjacent to a rear end portion of the top plate 384, and in front of the guide ring 376. A pressure plate 388 of the pressure device 386 is elongate in the front to rear direction. A spring assembly 390 extends between the pressure plate 388 and the top plate 384. The spring assembly 390 biases the pressure plate 388 downward, away from the top plate 384.

A strip of friction material 392 is affixed to a lower side of the pressure plate 388. The material of the strip 392 may be any suitable material. The material has a static coefficient of friction which is approximately the same as its dynamic coefficient of friction. Preferably, the material is a cerametallic material.

The apparatus 356 includes two strips of friction material 396 (only one shown). The strips of friction material 396 are identical and only one of the strips of friction material is described in detail. The material of the strip 396 may be any suitable material and is preferably a material which has a static coefficient of friction which is approximately the same as its dynamic coefficient of friction. In one preferred example, the strip of friction material may be made of the same material as the strip of friction material 392 in the pressure device 386.

The strip of friction material 396 is elongate along the front to rear direction and is located on top of a portion of the elongate segment 360, near the rear end of the elongate segment, and between the guide rings 374 and 376 when the seat carrier 372 is adjacent to the seat back 22. The strip of friction material 396 is secured to the elongate segment 360 by fasteners 398. The fasteners 398 may be any suitable fasteners, such as metal screws.

The strip of friction material 392 of the pressure device 386 is initially positioned relative to the strip of friction material 396 such that the strip of friction material 392 is adjacent to a rear end portion of the strip of friction material 396. The spring assembly 390 biases the pressure plate 388 and the strip of friction material 392 such that the strip of friction material 392 is in engagement with the strip of friction material 396. The strips of friction material 392 and 396 resist relative sliding movement. Accordingly, the pressure device 386 and the strip of friction material 396 is a brake-like device.

The apparatus 356 includes two annular stop collars 402 (only one shown). Each stop collar 402 is located near the front end portion of the elongate segment 360 of a respective support bar 358. The stop collars 402 are fixed on the support bars 358 with suitable fasteners 404.

When a child (not shown) is to be transported in a vehicle, the apparatus 356 is secured onto the vehicle seat 12 in a manner identical to the securing of the first embodiment. The child is secured within the child seat 54 in a manner identical to that of the first embodiment. During normal vehicle travel, the child seat 54 is located near the seat back 22.

Upon the occurrence of a vehicle collision, the vehicle is suddenly decelerated. The seat carrier 372 is urged forward along the support bars 358 because of the inertia of the seat carrier, the child seat 54 and the child sitting in the child seat. Friction between the strips of friction material 392 and the strips of friction material 396 resists relative movement of the strips of friction material 392 along the strips of friction material 396.

If the force tending to slide the strips of friction material 392 along the strips of friction material 396 is below a predetermined amount, the static friction is not overcome and the strips of friction material 392 do not move relative to the strips of friction material 396. Accordingly, the friction between the strips of friction material 392 and the strips of friction material 396 prevents forward movement of the seat carrier 372 along the elongate segments 360 of the support bars 358.

If the force tending to slide the strips of friction material 392 along the strips of friction material 396 is above the predetermined amount, the static frictional engagement between the strips of friction material 392 and the strips of friction material 396 is overcome and the strips of friction material 392 slide along the strips of friction material 396. The seat carrier 372, child seat 54 and the child move forward relative to the vehicle seat 12 until the front guide rings 374 abut against the stop collars 402. During movement of the seat carrier 372 along the elongate segments 360, the strips of friction material 396 pass through the notches 382 in the guide rings 376.

The deceleration of the child occurs over a longer period of time and is less abrupt than if the child seat 54 and the child were not permitted to move. Energy is absorbed by the sliding of the strips of friction material 392 across the strips of friction material 396 and less energy is physically absorbed by the child.

Figure 11:
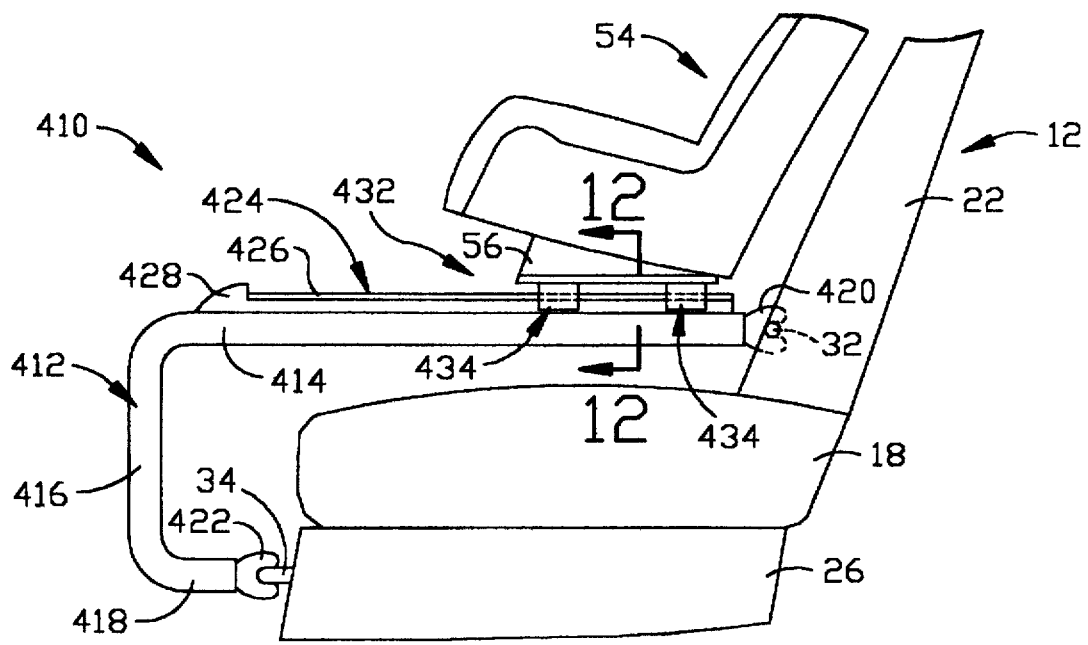
FIG. 11 is a side view of an eighth embodiment of the present invention.

An apparatus 410 according to a eighth embodiment of the present invention is shown in FIG. 11. The apparatus 410 is located on a vehicle seat 12 of a vehicle (not shown). The vehicle seat 12 is identical to the vehicle seat described with reference to the first embodiment. Accordingly, the same reference numerals are used to identify identical structure. The apparatus 410 includes two support bars 412 (only one shown). The support bars 412 are identical to each other and only one of the support bars is described, with the understanding that the other support bar has identical structure and function.

The support bar 412 is made of metal, or other suitable material, and is generally J-shaped. The support bar 412 is located adjacent to the seat bottom 18. An elongate segment 414 of the support bar 412 is elongate in a direction from front to rear. The elongate segment 414 extends from a location adjacent to the seat back 22, above the seat bottom 18, to a location above and in front of the seat bottom. A first right angle bend of the support bar 12 is at a first end portion of the elongate segment 414. A vertical segment 416 of the support bar 412 extends downward from the first bend to a location at the level of the seat base 26. A second right angle bend is at a lower end of the vertical segment 416. The support bar 412 has a lower segment 418 which extends rearward from the second bend to a location adjacent to the seat base 26.

Attached to the rear end portion of the elongate segment 414 is a first connector 420 (schematically shown). The first connector 420 is locked with the first mounting fixture 32 to fix the support bar 412 relative to the seat back 22. A second connector 422 is fixed to the rear end portion of the lower segment 418 of the support bar 412. The second connector 422 is locked with the second mounting fixture 34. The first and second connectors 420 and 422 are identical to the first and second connectors 36 and 38 of the first embodiment.

The second support bar 412 (not shown) is attached to the vehicle seat in the same manner. The two support bars 412 are spaced apart, parallel to each other. The support bars 412 are detachable from the vehicle seat 12 when the first and second connectors 420 and 422 are unlocked, to permit use of the vehicle seat 12 by an adult vehicle occupant (not shown).

The support bar 412 includes a rib 424 extending along the elongate segment 414. The rib 424 is located on a top side of the elongate segment 414. The rib 424 may be formed as one piece with the elongate segment 414 or may be attached to the elongate segment by suitable fasteners (not shown).

Figure 12:
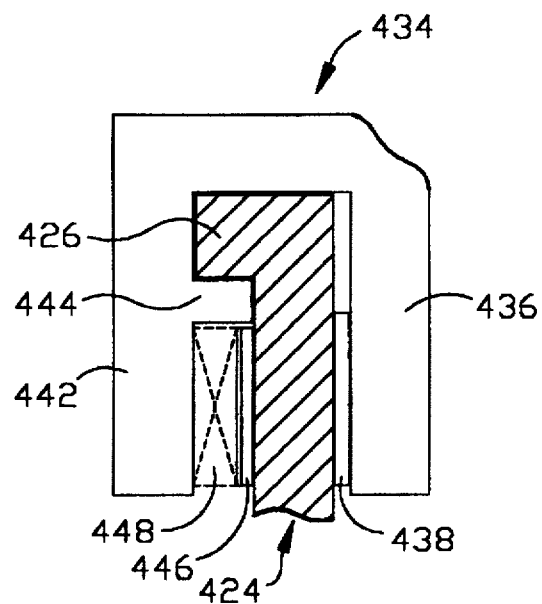
FIG. 12 is a view taken along line 12—12 in FIG. 11, partially broken away.

The rib 424 has a lip 426 (FIG. 12) which extends in an outboard direction from a top portion of the rib. Accordingly, the rib 424 with its lip 426 has a cross section shape of an inverted "L". The lip 426 extends along a majority of the length of the rib 424. At a front end of the rib 424 is a projection 428 (FIG. 11). The projection 428 has a vertical height which is greater than the height of the rest of the rib 424.

A child seat 54 is the same as the child seat of the first embodiment, and the child seat is connected to a seat carrier 432. The seat carrier 432 extends between the two support bars 412. The seat carrier 432 is made of metal or other suitable material. At each side of the seat carrier 432 is a pair of guide brackets 434 (only one pair shown). Each pair of guide brackets 434 is identical and only one pair of guide brackets is discussed in detail, with the understanding that the other pair of guide brackets has identical structure and function. One of the guide brackets 434 is located at a front end portion of the seat carrier 432 and the other guide bracket is located at a rear end portion of the seat carrier.

The two guide brackets 434 have identical structure and only one of the guide brackets is discussed in detail. The guide bracket 434 has a first limb 436 (FIG. 12) which extends downward from the seat carrier 432 along an inboard side of the rib 424. A friction pad 438 is attached to a side of the first limb 436 which faces the rib 424. The friction pad 438 engages the inboard side surface of the rib 424. The material of the friction pad 438 may be any suitable material. The material has a static coefficient of friction which is approximately the same as its dynamic coefficient of friction. Preferably, the material is a cera-metallic material.

A second limb 442 of the guide bracket 434 extends downward from the seat carrier 432 and along the outboard side of the rib 424. The first and second limbs 436 and 442 are parallel to each other and are spaced apart a distance which is slightly greater than the width of the lip 426. The second limb 442 has a projection 444 which extends toward the first limb 436. The projection 444 is located a distance from the top of the second limb 442.

A friction pad 446 is mounted via a spring assembly 448 (schematically shown) to the second limb 442. The friction pad 446 and the spring assembly 448 are located beneath the projection 444. The spring assembly 448 biases the friction pad 446 away from the second limb 442 and toward the rib 424, and the friction pad 446 engages the outboard side surface of the rib 424. The material of the friction pad 446 may be any suitable material and is preferably a material which has a static coefficient of friction which is approximately the same as its dynamic coefficient of friction. In one preferred example, the friction pads 438 and 446 are made of the same material.

The guide bracket 434 is mounted on the rib 424 such the projection 444 is located beneath the lip 426 of the rib. Accordingly, the guide bracket 434 is constrained to move along the length of the rib 424 and can only be removed from the rib by moving the guide bracket 434 past a rear end of the rib. The spring assembly 448 causes the rib 424 to be pinched or squeezed between the two friction pads 438 and 446. The friction pads 438 and 446, the spring assembly 448 and the rib 424 define a brake-like mechanism.

When a child (not shown) is to be transported in a vehicle, the apparatus 410 is secured onto the vehicle seat 12 in a manner identical to the securing of the first embodiment. The child is secured within the child seat 54 in a manner identical to that for the first embodiment. During normal vehicle travel, the child seat 54 is located near the seat back 22. The engagement between the friction pads 438 and 446 and the rib 424 resists movement of the seat carrier 432 relative to the support bars 412.

Upon the occurrence of a vehicle collision, the vehicle is suddenly decelerated. The seat carrier 432 is urged forward along the support bars 412 because of the inertia of the seat carrier, the child seat 54 and the child sitting in the child seat.

If the force tending to slide the friction pads 438 and 446 along the rib 424 is below a predetermined amount, the friction pads 438 and 446 do not move relative to the rib 424. Accordingly, the friction pads 438 and 446 prevent forward movement of the seat carrier 432 along the ribs 424.

If the force is above the predetermined amount, the static frictional engagement between the friction pads 438 and 446 and the rib 424 is overcome and the friction pads 438 and 446 slide along the rib 424. The seat carrier 432 can move until the front guide brackets 434 abut against the projections 428.

The deceleration of the child occurs over a longer period of time and is less abrupt than if the child seat 54 and the child were not permitted to move. Energy is absorbed by the sliding of the friction pads 438 and 446 along the rib 424 and less energy is physically absorbed by the child.

From the above description of the invention, those skilled in the art will perceive improvements, changes and modifications. For example, in the first-third and fifth-seventh embodiments (FIGS. 1–4 and 7–10), the elongate segments of the support bars could have a shape other than cylindrical and the seat carriers would have correspondingly shaped portions engaging the non-cylindrical elongate segments. Such improvements, changes and modifications within the skill of the art are intended to be, covered by the appended claims.

Having described the invention, the following is claimed:

1. An apparatus for use in a vehicle, said apparatus comprising:

a child seat for holding a child;

support means for supporting said child seat on a seat of the vehicle and for permitting movement of said child seat and a child sitting in said child seat relative to said support means and the vehicle seat during a collision in which at least one condition exceeds a predetermined threshold, said support means including a support member having an elongate segment, and a seat carrier engaging said elongate segment and being movable along said elongate segment, said movement of said child seat being along said elongate segment with said seat carrier; and means for absorbing kinetic energy of the child and said child seat during movement of said child seat relative to said support means and the vehicle seat, said means for absorbing energy having one portion engaging said support member and another portion engaging said seat carrier, and including an energy absorbing member, said energy absorbing member being a deformable bellows and being compressed in a direction along said elongate segment during movement of said seat carrier along said elongate segment.

2. An apparatus as set forth in claim 1, wherein said seat carrier has a portion which encircles said elongate segment.

3. An apparatus as set forth in claim 1, wherein said support member and said seat carrier cooperating during movement of said seat carrier and said child seat relative to said support member such that said movement of said child seat is limited to be in a direction along said elongate segment.

4. An apparatus as set forth in claim 1, wherein said bellows has a plurality of pleats.

5. An apparatus as set forth in claim 1, wherein said bellows is rigid for resisting movement of said seat carrier prior to the occurrence of a force above a predetermined amount urging movement of said seat carrier and said bellows is compressed upon the occurrence of a force above the predetermined amount to permit movement of said seat carrier.

6. An apparatus as set forth in claim 1, wherein said support means includes connectors for lockingly engaging mounting fixtures of the vehicle seat.

7. An apparatus as set forth in claim 1, wherein said bellows is metal.

8. An apparatus as set forth in claim 1, wherein said bellows extends around a portion of said elongate segment.

9. An apparatus for use in a vehicle, said apparatus comprising:

a child seat for holding a child;

support means for supporting said child seat on a seat of the vehicle and for permitting movement of said child seat and a child sitting in Said child seat relative to said support means and the vehicle seat during a collision in which at least one condition exceeds a predetermined threshold, said support means including means for constraining said child seat to non-pivoting movement relative to the vehicle seat; and means for absorbing kinetic energy of the child and said child seat during movement of said child seat relative to said support means and the vehicle seat.

10. An apparatus as set forth in claim 9, wherein said support means includes a support member which has an elongate segment, and a seat carrier engaging said elongate segment and being movable relative to said elongate segment.

11. An apparatus as set forth in claim 10, wherein said seat carrier includes a tubular portion having a passage through which said elongate segment of said support member extends, said passage of said tubular portion has a diameter larger than a diameter of said elongate segment for permitting sliding of said seat carrier along said elongate segment.

12. An apparatus as set forth in claim 10, wherein said means for absorbing energy includes a deformable member which is fixed to said support member, said seat carrier includes means for deforming said deformable member.

13. An apparatus as set forth in claim 12, wherein the deformation of said deformable member is non-elastic deformation.

14. An apparatus for use in a vehicle, said apparatus comprising:

a child seat for holding a child;

support means for supporting said child seat on a seat of the Vehicle and for permitting movement of said child seat and a child sitting in 'said child seat relative to said support means and the vehicle seat during a collision in which at least one condition exceeds a predetermined threshold; and means for absorbing kinetic energy of the child and said child seat during movement of said child seat relative to said support means and the vehicle seat, said means for absorbing kinetic energy including a member which is non-elastically deformed.

15. An apparatus as set forth in claim 14, wherein said support means includes a support member which has an elongate segment, and said movement of said child seat is along said elongate segment.

16. An apparatus as set forth in claim 15, wherein said support means includes a seat carrier engaging said elongate segment and movable along said elongate segment.

17. An apparatus as set forth in claim 16, wherein said means for absorbing energy has one portion engaged with said support member and another portion engaged with said seat carrier.

18. An apparatus as set forth in claim 17, wherein said means for absorbing energy includes an energy absorbing member which is compressed in a direction along said elongate segment during movement of said seat carrier along said elongate segment.

19. An apparatus as set forth in claim 18, wherein said energy absorbing member is crushable and said elongate segment and said seat carrier include portions for crushing said energy absorbing member.

20. An apparatus as set forth in claim 16, wherein said means for absorbing energy includes an energy absorbing member which is deformed during movement of said seat carrier along said elongate segment.

21. An apparatus as set forth in claim 20, wherein said energy absorbing member is fixed to said support means, said seat carrier including means for deforming said energy absorbing member.

22. An apparatus as set forth in claim 21, wherein said means for deforming includes means for cutting said energy absorbing member.

23. An apparatus as set forth in claim 21, wherein said energy absorbing member has a plurality of projections, said seat carrier including means for bending said projections.

24. An apparatus as set forth in claim 23, wherein said projections are in an array extending along said elongate segment.

25. An apparatus as set forth in claim 24, wherein said projections extend into a slot of said energy absorbing member, said means for bending said projections including a pin extending though said slot.

26. An apparatus as set forth in claim 20, wherein said energy absorbing member is crushable and said support member and said seat carrier include portions for crushing said energy absorbing member.

27. An apparatus as set forth in claim 20, wherein said energy absorbing member includes a torsion rod having one of its ends fixed relative to said support member, said energy absorbing means including means for twisting the other end of said torsion rod during movement of said seat carrier along said elongate segment.

28. An apparatus as set forth in claim 27, wherein said means for twisting includes a rotatable spool and a flexible member coiled around said spool, said flexible member being attached to said seat carrier and rotates said spool during movement of said seat carrier along said elongate segment.

29. An apparatus as set forth in claim 16, wherein said seat carrier has a portion which encircles said elongate segment.

30. An apparatus as set forth in claim 16, wherein said seat carrier has a portion which interfits with a portion of said elongate segment.

31. An apparatus as set forth in claim 16, wherein said support means includes stop means for stopping movement of said seat carrier at an end of a stroke of movement.

32. An apparatus as set forth in claim 14, wherein said means for absorbing energy includes a deformable material.

33. An apparatus as set forth in claim 32, wherein said means for absorbing energy includes means for crushing said deformable material.

34. An apparatus as set forth in claim 32, wherein said means for absorbing energy includes means for cutting said deformable material.

* * * * *